(12) United States Patent
Sivinski

(10) Patent No.: US 11,716,922 B2
(45) Date of Patent: Aug. 8, 2023

(54) AGRICULTURAL TOOLBAR WITH WING FLEX LOCK

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 289 days.

(21) Appl. No.: 16/949,062

(22) Filed: Oct. 12, 2020

(65) Prior Publication Data

US 2021/0105930 A1 Apr. 15, 2021

Related U.S. Application Data

(60) Provisional application No. 62/913,250, filed on Oct. 10, 2019.

(51) Int. Cl.
*A01B 73/04* (2006.01)

(52) U.S. Cl.
CPC .......... *A01B 73/046* (2013.01); *A01B 73/044* (2013.01)

(58) Field of Classification Search
CPC ....... A01B 73/02; A01B 73/04; A01B 73/042; A01B 73/044; A01B 73/046; A01B 73/06; A01B 73/065; A01B 73/067; A01B 63/111; A01B 63/114
See application file for complete search history.

(56) References Cited

U.S. PATENT DOCUMENTS

| | | | | | |
|---|---|---|---|---|---|
| 4,074,766 | A | * | 2/1978 | Orthman | A01B 73/04 172/457 |
| 5,540,290 | A | * | 7/1996 | Peterson | A01B 73/044 172/311 |
| 6,068,063 | A | * | 5/2000 | Mayerle | F15B 11/17 280/421 |
| 8,291,994 | B2 | * | 10/2012 | Hulicsko | A01B 29/02 172/311 |
| 9,763,378 | B2 | * | 9/2017 | Redekop | A01B 73/067 |
| 9,883,623 | B2 | * | 2/2018 | Koch | A01B 63/1145 |
| 10,064,323 | B2 | * | 9/2018 | Hahn | F15B 15/202 |
| 10,143,136 | B2 | * | 12/2018 | Sudhues | A01D 41/144 |
| 10,813,268 | B2 | * | 10/2020 | Blackwell | A01C 7/208 |
| 11,337,357 | B2 | * | 5/2022 | Sivinski | A01B 73/046 |
| 2005/0211144 | A1 | * | 9/2005 | Gust | A01C 7/208 111/54 |
| 2011/0131762 | A1 | * | 6/2011 | Palen | A01B 73/046 16/371 |
| 2014/0034341 | A1 | * | 2/2014 | Fast | A01B 73/067 172/311 |

(Continued)

*Primary Examiner* — Jamie L McGowan
(74) *Attorney, Agent, or Firm* — McKee, Voorhees & Sease, PLC

(57) ABSTRACT

A horizontally foldable toolbar includes opposite wings having flex joints which can be selectively locked to prevent flexing of the joints when the wings are in a transport position and unlocked to permit flexing of the joints when the wings are in a field position. The lock assembly includes a hydraulic cylinder with an extendable and retractable arm. Operation of the hydraulic cylinder can be controlled by an operator remotely, such as from a tractor cab. The stroke of the hydraulic cylinder can be adjusted to accommodate wear on the wing components.

5 Claims, 19 Drawing Sheets

(56) References Cited

U.S. PATENT DOCUMENTS

| | | | |
|---|---|---|---|
| 2015/0068779 A1* | 3/2015 | Naylor | A01B 73/046 |
| | | | 172/1 |
| 2015/0208571 A1* | 7/2015 | Hahn | A01B 71/02 |
| | | | 172/663 |
| 2015/0296700 A1* | 10/2015 | Redekop | A01B 73/067 |
| | | | 172/667 |
| 2018/0255695 A1* | 9/2018 | Kinzenbaw | A01B 73/005 |
| 2019/0075707 A1* | 3/2019 | Sivinski | A01B 73/044 |
| 2020/0053951 A1* | 2/2020 | Becker | F16C 11/045 |
| 2020/0221628 A1* | 7/2020 | Blunier | A01B 63/14 |

\* cited by examiner

AGRICULTURAL TOOLBAR WITH WING FLEX LOCK

CROSS-REFERENCE TO RELATED APPLICATION

This application claims priority under 35 U.S.C. § 119 to Provisional Application U.S. Ser. No. 62/913,250, filed on Oct. 10, 2019, which is herein incorporated by reference in its entirety including without limitation, the specification, claims, and abstract, as well as any figures, tables, or examples thereof.

FIELD OF THE INVENTION

The invention is directed to a tool bar having wings which pivot about a vertical axis to fold and unfold horizontally between field and transport positions, and to a hydraulic cylinder to lock the wings against flex while in the transport position.

BACKGROUND OF THE INVENTIONS

Folding tool bars are well known, and generally include horizontal folding and/or vertical folding of the toolbar wings. Generally, the horizontal folding tool bars include a longitudinally extending tongue, which often is telescoping, with the transverse frame member at the rear of the tongue. A pair of wings are pivotally attached to the rear frame member so as to fold between a use position extending laterally in opposite directions, and a transport position extending parallel and adjacent the tongue. The wings and the rear frame have wheels for rolling support in the use and/or transport positions. Folding and unfolding the wings is accomplished with hydraulic cylinders.

Recent wing designs include multiple joints to allow the wings to flex to follow the ground contour during use in the field. Each wing section may include support wheels. The middle or interior wheels may be raised for the transport position and lowered for the use position via hydraulics. However, in both the use and the transport positions, the wing sections may flex, which is undesirable during transport. Any flexing or sagging of the wing during transport would allow the middle wheels to contact the ground, causing damage to the wheels and/or support structure. Also, telescoping tongues do not allow a fixed support for the wings in the transport mode. There is a need to lock this mid-pivot joint against flexing when the wings are folded to the transport or road position.

Therefore, a primary objective of the present invention is the provision of a wing flex lock for a folding tool bar which prevents flexing of the wing at the hinge joint when the wing is in the transport position.

Another objective of the present invention is a provision of a means and method for locking the pivotal joint of a hinged wing when the wing is in the transport position.

Another objective of the present bench is a provision of a wing flex lock for a toolbar which is hydraulically actuated from the tractor cab.

A further objective of the present invention is a provision of a hydraulic cylinder which can be extended when the wing is in the use position to allow flex of the wing so as to follow the field contour, and which can be retracted when the wing is in the transport position to lock the wing against flex.

Another objective of the present invention is a provision of a flex lock for a toolbar wing which has a simple construction, and which is easy and safe to use.

Another objective of the present invention is a provision of a hydraulic cylinder which is extended and retracted to lock and unlock a flex joint on an agricultural tool bar wing.

A further objective of the present invention is the provision of a hydraulic cylinder for locking and unlocking a flex pivot joint on a tool bar wing remotely from the tractor cab.

Still another objective of the present invention is the provision of a jointed tool bar wing which is flexible in the field position and rigid in the road position.

Yet another objective of the present invention is the provision of a method for locking the horizontally folding wings of a tool bar against flexing while in a forwardly folded transport position.

These and other objectives become apparent from the following description of the invention.

SUMMARY OF THE INVENTION

An agricultural tool bar is provided with a center tool bar section and opposite left, and right inner wing sections pivotally connected to opposite ends of the center section. Left and right outer wing sections are pivotally connected to the outer ends of the left and right inner wing sections, respectively. The pivotal connections form flex joints for the inner and outer wing sections. Left and right lock assemblies are provided adjacent the flex joints between the inner and outer wing sections to control flexing of the wing sections. Each lock assembly includes a hydraulic cylinder with an extendable and retractable arm. When the arm is retracted, the inner and outer wing sections are free to flex upwardly and downwardly. When the cylinder arm is extended, the inner and outer wing sections are locked against flexing. The wings sections are foldable about a vertical axes between a field position and a transport position. The flex lock assemblies are unlocked when the wing sections are in the field position and are locked when the wing sections are in the transport position. In order to accommodate wear on the wing section components, a threaded adjustment bolt can be extended or retracted to control the length of the stroke of the hydraulic cylinder arm of each lock assembly.

The method of controlling flexing of the inner and outer wing sections of the toolbar comprises extending the hydraulic cylinder arms to lock the wing sections against flexing prior to moving the wing sections from the field position to the transport position, and retracting the hydraulic cylinder arms after moving the wing sections from the transport position to the field position so as to allow flexing of the wing sections.

DETAILED DESCRIPTION OF THE INVENTION

Figure 1:
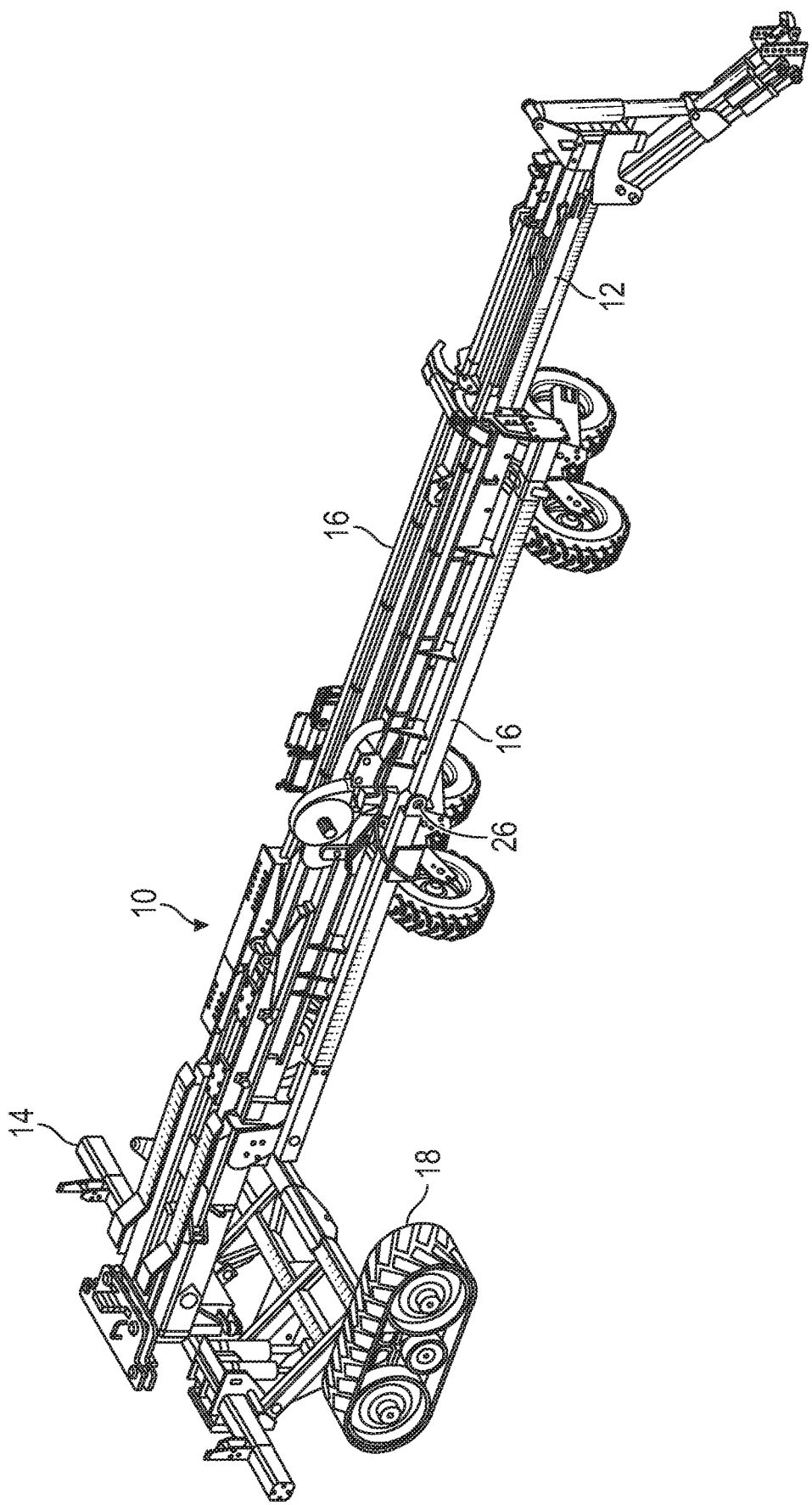
FIG. 1 is a perspective view of an agricultural tool bar having opposite wings folded forwardly to a transport position.
Figure 2:
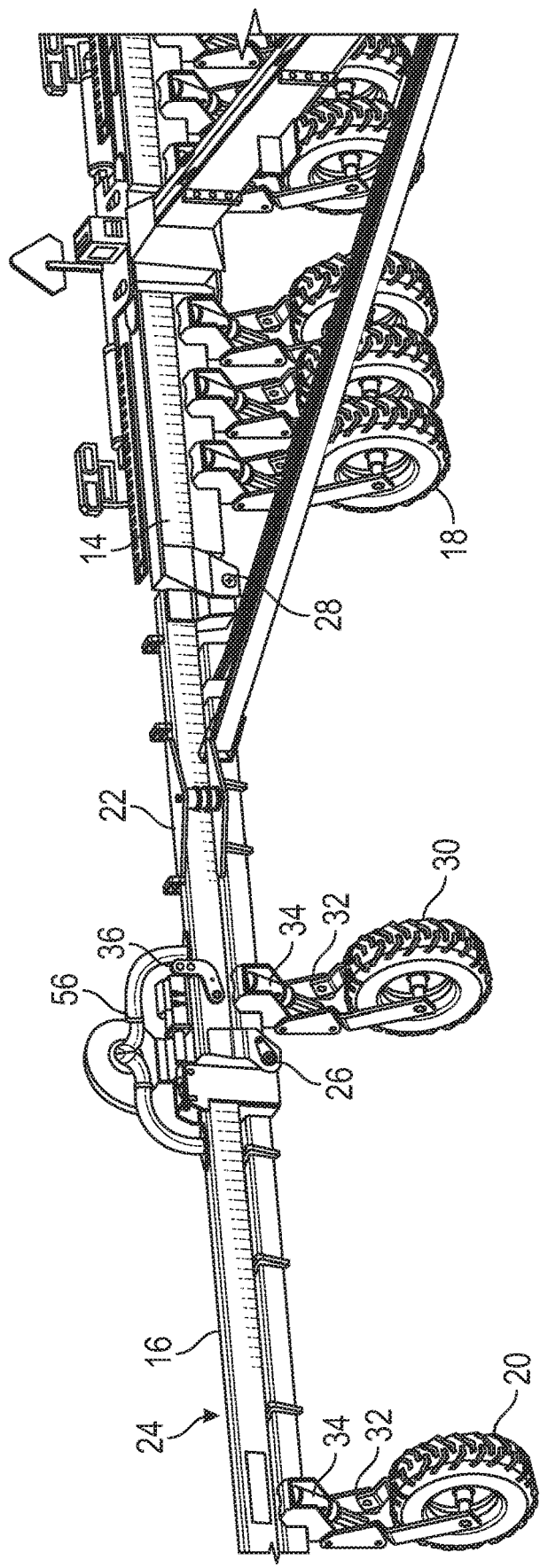
FIG. 2 is a perspective view showing the right wing unfolded to the use position.
Figure 3:
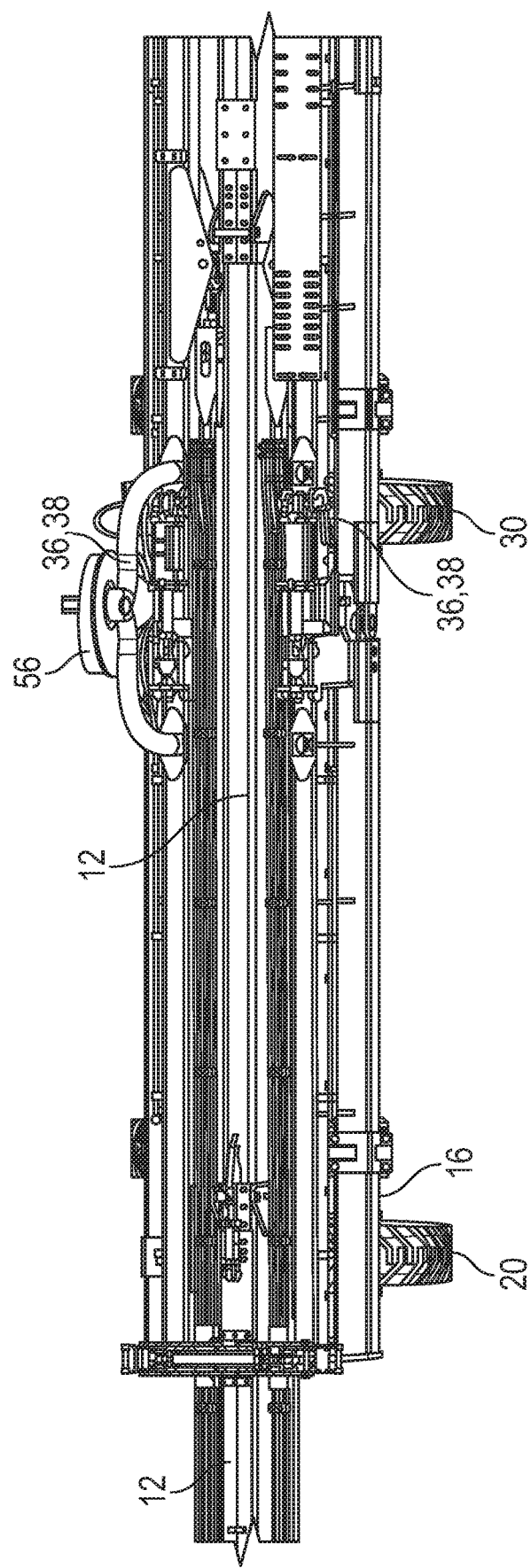
FIG. 3 is a view from above the folded tool bar wings in the transport position.
Figure 4:
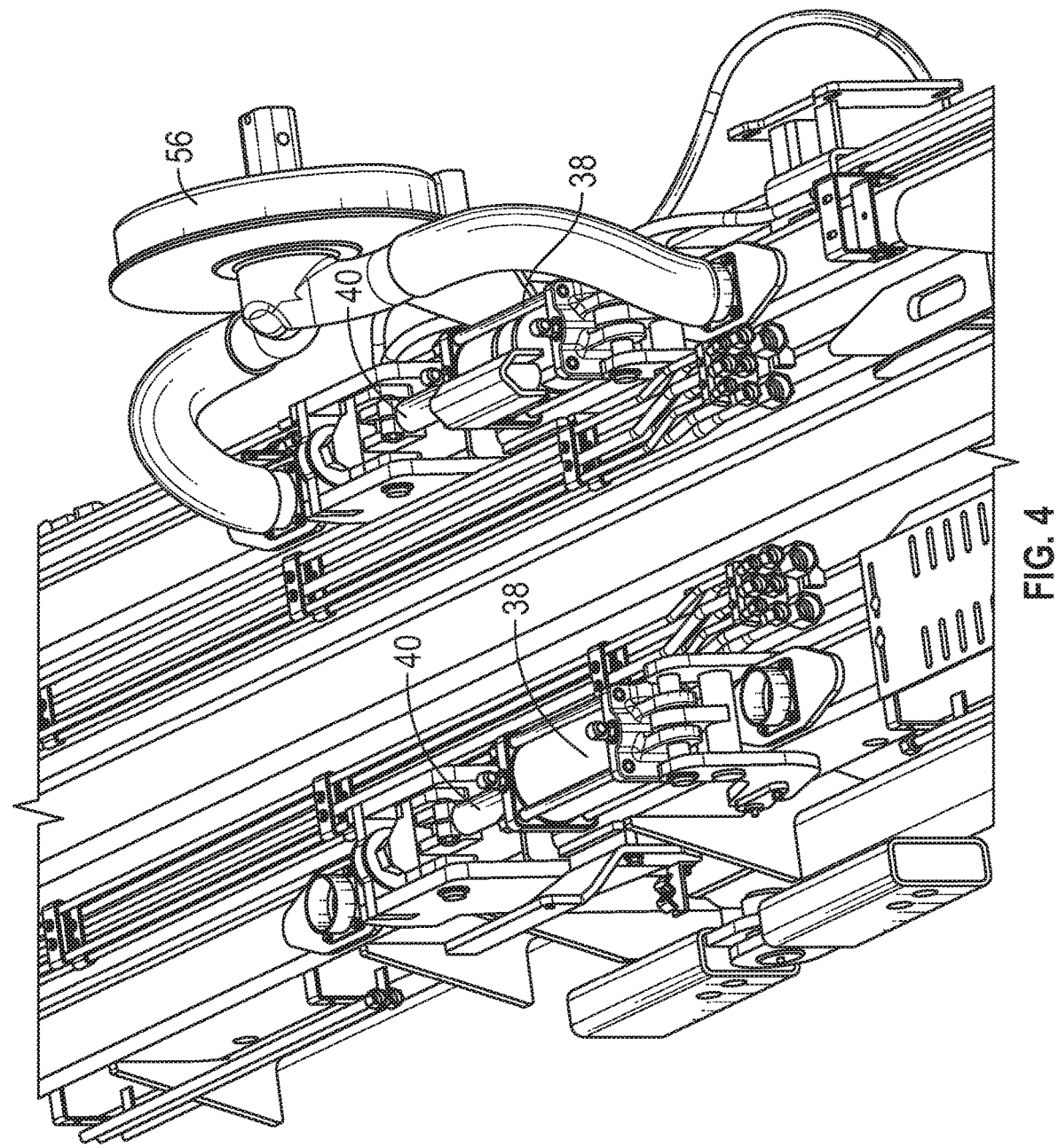
FIG. 4 is an enlarged view from above showing the hydraulic flex cylinders which lock and unlock the flex joint of the wings.
Figure 5:
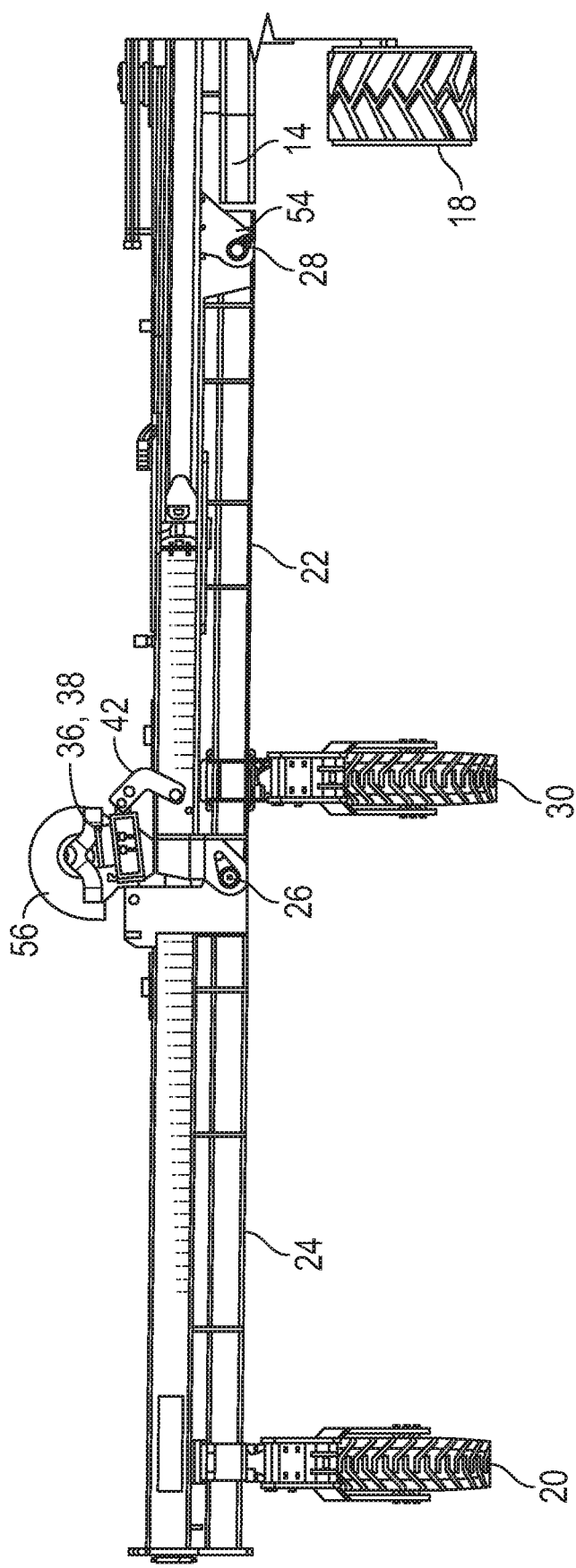
FIG. 5 is a front elevation view of the right wing in the use position, with the inner and outer wing sections being aligned and unflexed.
Figure 6:
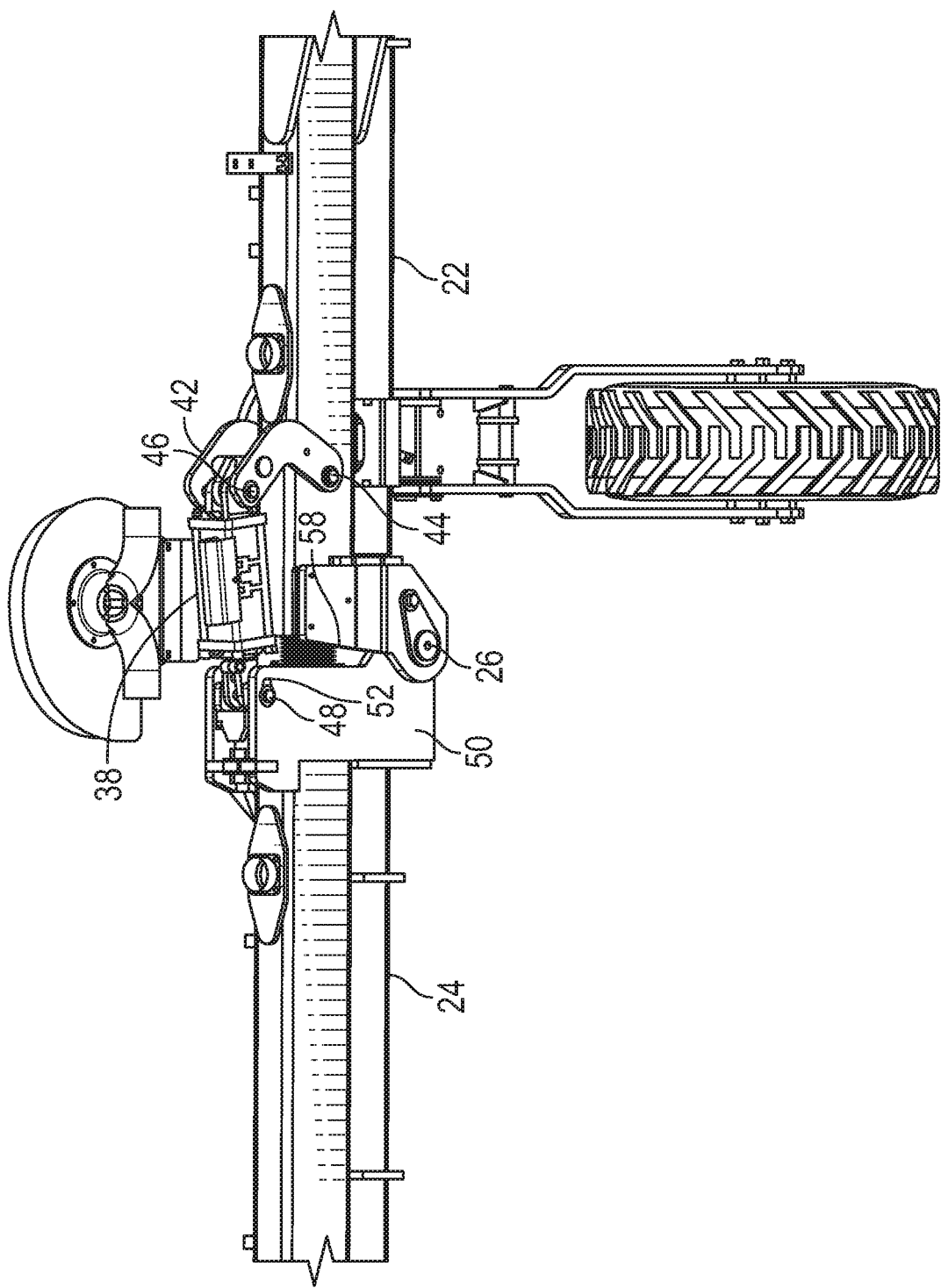
FIG. 6 is another perspective view of the flex joint and flex cylinder of the right wing in a use position.
Figure 7:
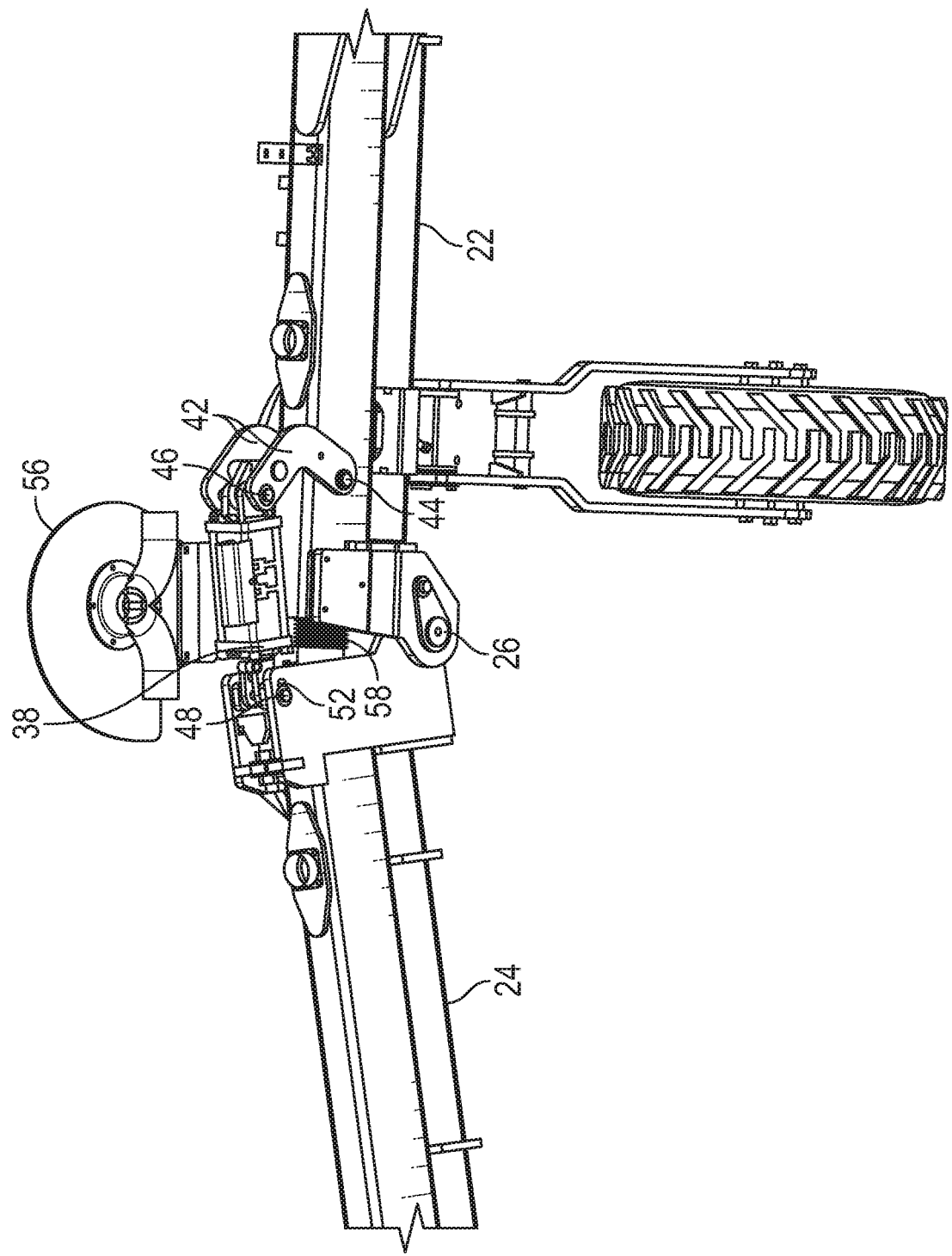
FIG. 7 is a view similar to FIG. 5 showing the outer wing section flexed downwardly.
Figure 8:
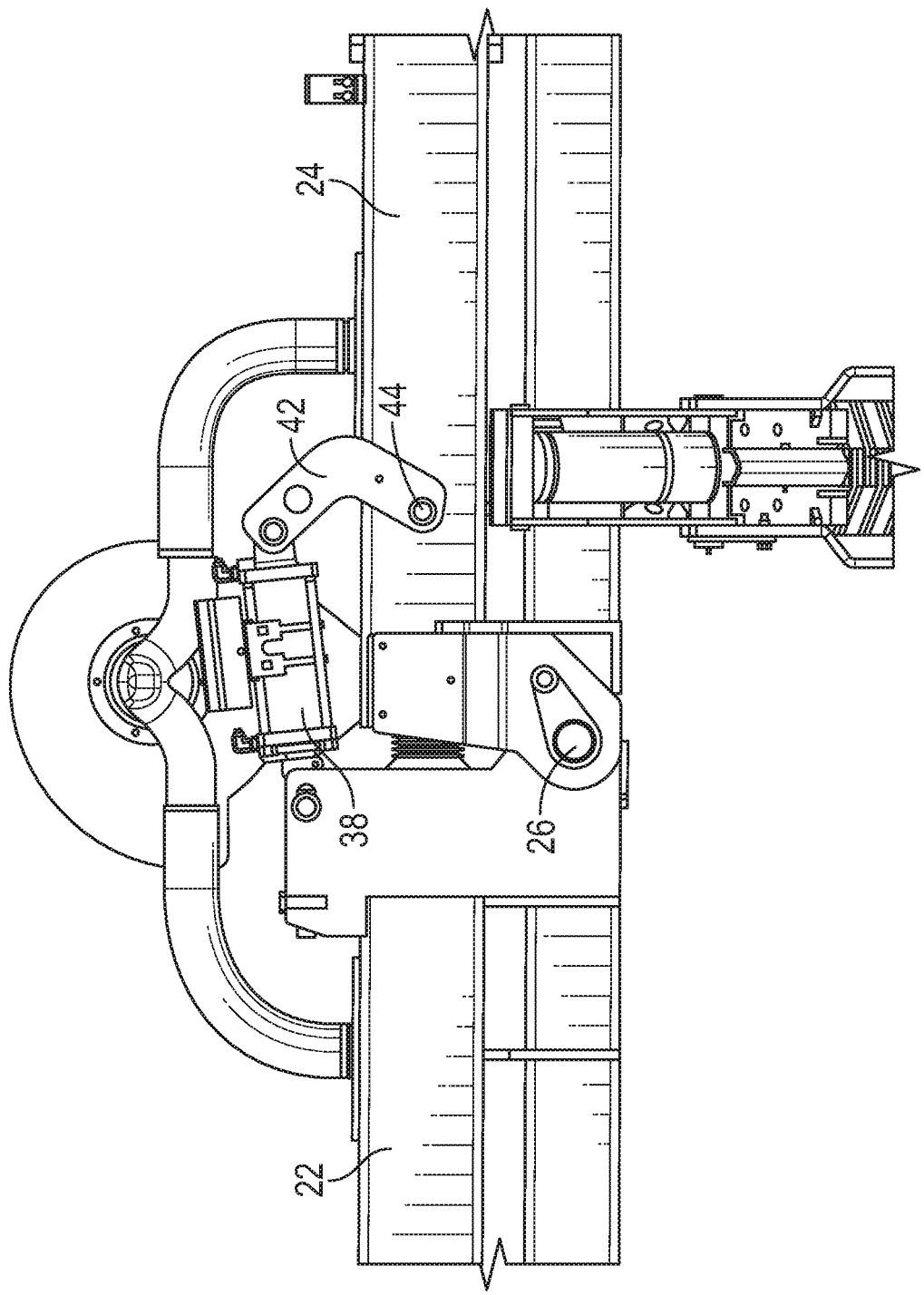
FIG. 8 is an enlarged front elevation view showing the right wing in an unlocked use position, and unflexed.
Figure 9:
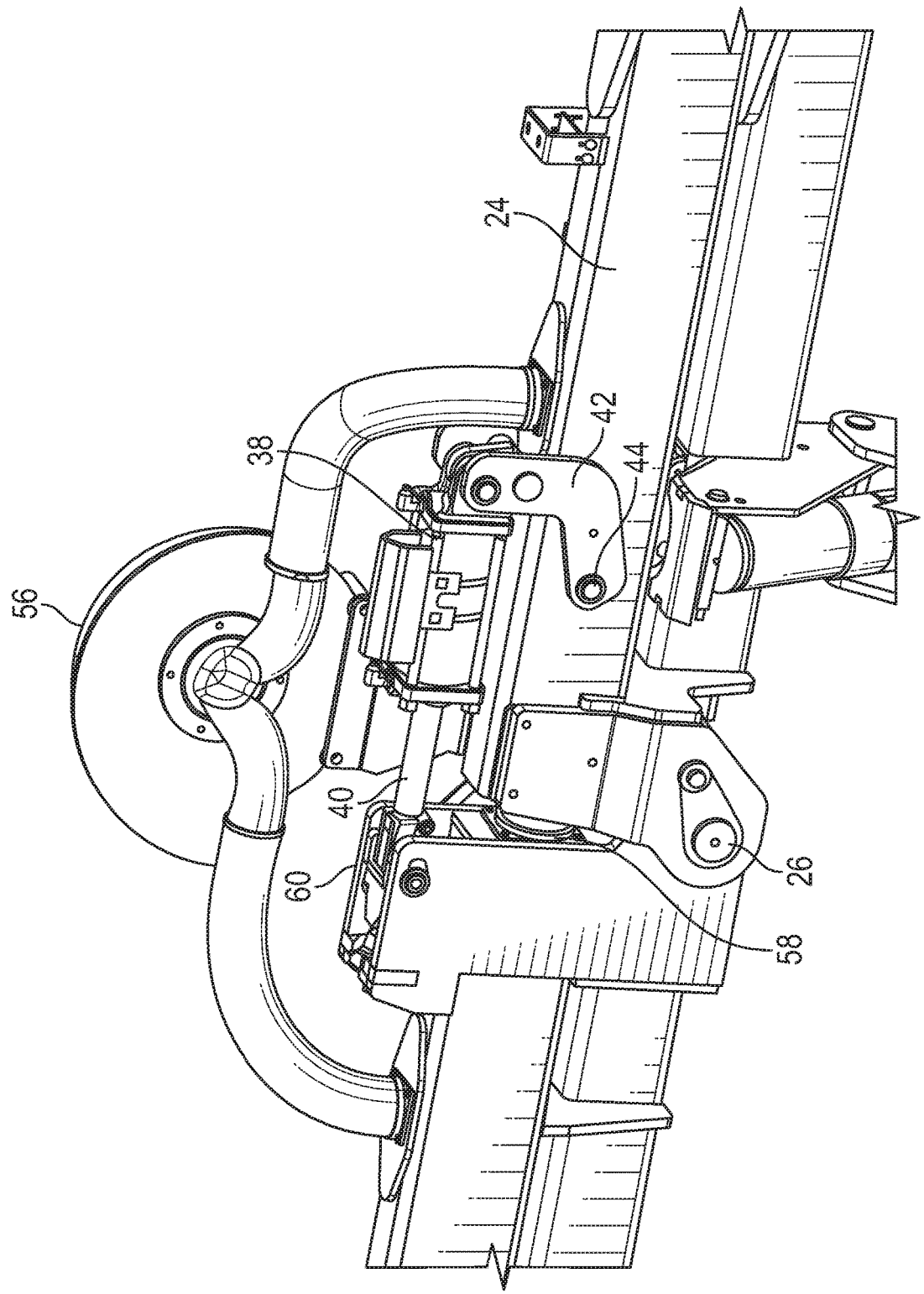
FIG. 9 is a front perspective view of the wing in the locked position.
Figure 10:
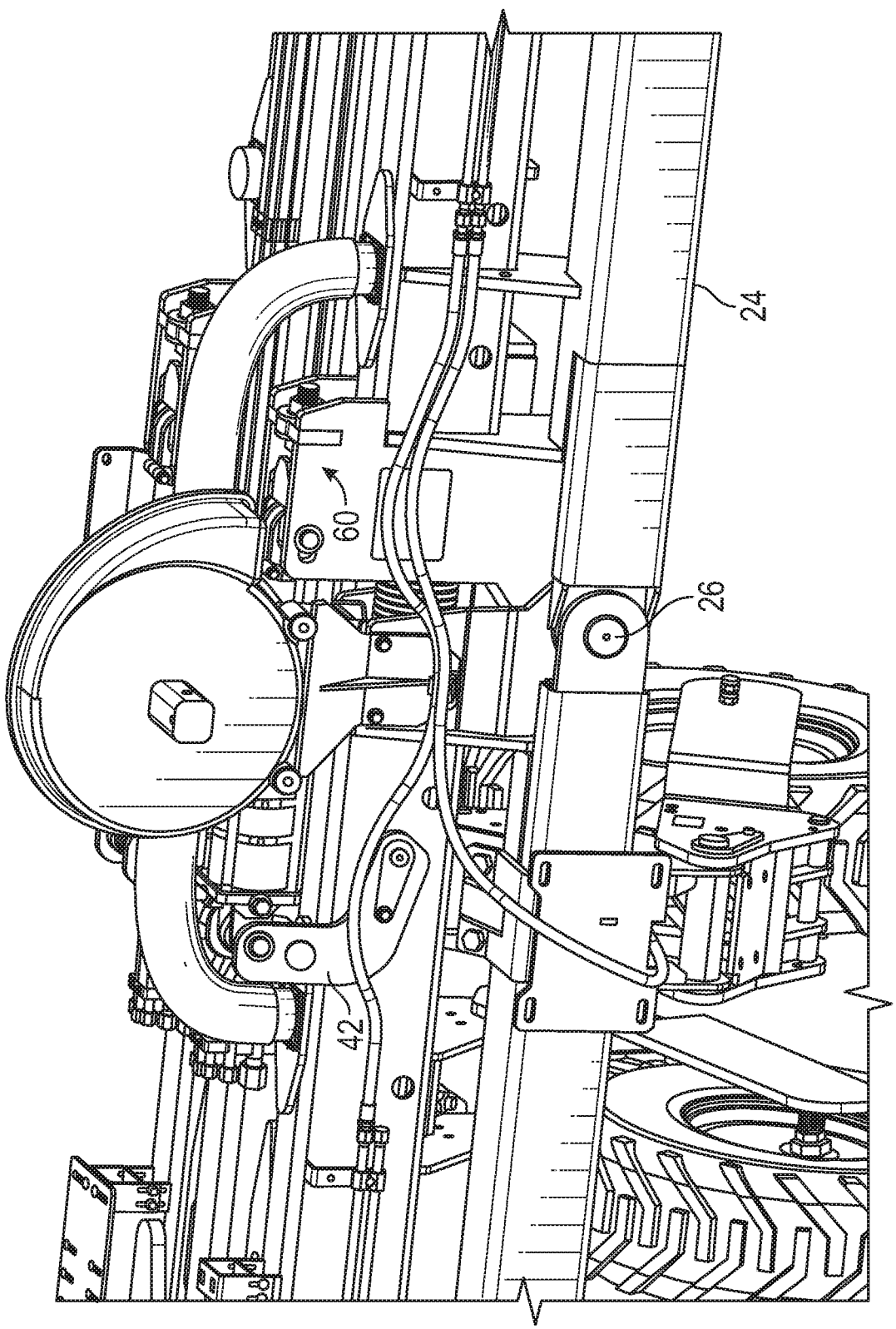
FIG. 10 is another perspective view showing the wing in a locked position.

A folding toolbar is designated in the drawings by the reference 10. The toolbar 10 includes a longitudinally telescoping tongue 12, with a rear central frame 14 extending laterally at the rear end of the tongue 12. A pair wings 16 are mounted to the rear frame 14 for pivotal movement about vertical axes between a folded transport position substantially parallel to the tongue, as shown in FIG. 1, and an unfolded use position extending laterally outwardly from opposite ends of the rear frame 14, as seen in FIG. 2. The center frame 14 may be supported by wheels or tracks 18.

The above-described general construction of the toolbar 10 is conventional and does not constitute a part of the present invention.

The left and right wings 16 are mirror images of one another. Therefore, the drawings and the following description apply to both wings.

Each wing 16 is supported at its outer end by one or more wheels 20. The wing 16 has an inner section 22 and an outer section 24 which are pivotally joined between the inner and outer ends at a horizontal, longitudinal pivot axis 26. The axis 26 thus forms a flex joint between the inner and outer wing sections. The inner wing section 22 is also joined to the end of the rear center frame 14 at a horizontal, longitudinal pivot axis 28. Thus, each wing section 22, 24 can flex or float relative to the other wing section, and the inner wing section 22 can flex or float relative to the rear center frame 14. The inner wing section 22 is supported by wheel 30 adjacent the pivot axis 26. Each wheel 20, 30 is connected to the respective wing section 24, 22 by a pivotal bracket structure 32. An extendable and retractable hydraulic cylinder 34 mounted to the brackets 32 allows each wheel 20, 30 to be moved between a lowered use position for supporting the wing sections 22, 24 in the field, or a raised, retracted position spaced above the ground or the road when the wing 16 is in the transport position.

A flex lock 36 is provided at the juncture of the outer end of the inner wing section 22 and the inner end of the outer wing section 24. The flex lock 36 includes a hydraulic cylinder 38 with an extendable and retractable arm 40. A pair of mounting arms 42 are mounted on the front and rear faces of the inner wing section 22 for pivotal movement about a horizontal pivot pin 44. The end of the cylinder 38 is operatively connected to the upper end of the mounting arms 42 by the pivot pin 46. The outer end of the arm 40 is pivotally connected by a pin 48 to a pair of plates 50 welded or otherwise fixed to the front and rear faces of the outer wing section 24. In the preferred embodiment, the pin 48 resides within a slot 52 in each of the plates. The pin passes through a U-shaped adjuster assembly 60 and the cylinder, end clevis. This adjuster is used to "straighten" the wing, by aligning the inner and outer wings 22, 24 during transport, due to component wear over time.

The flex cylinders 38 are inclined for a mechanical advantage. When the wing flex lock cylinder is in the fully retracted position, the angle and position of the cylinder allows for fully flexing of the wings without interference of the cylinder body with any part of the wing, thereby providing a mechanical advantage when the cylinder is fully retracted, so that the outer wing can flex independent of the inner wing. The fully retracted cylinder 38 and flex arms 42 are then free to follow the wing movements and let the wing sections 22, 24 flex.

The pivot joint 26 for the sections 22, 24 includes a pair of front and rear plates 54 secured to the inner wing section 22. The pivot pin 26 extends through the plates 54 and 50 at a location beneath the wing sections 22, 24.

The toolbar 10 includes a pneumatic system, with a fan 56 and bellows 58 at the pivotal joints of the wing sections 22, 24 and 22, 14. The details and function of the pneumatic system are described in Applicant's issued U.S. Pat. No. 9,554,505, which is incorporated herein by reference in its entirety.

Figure 15:
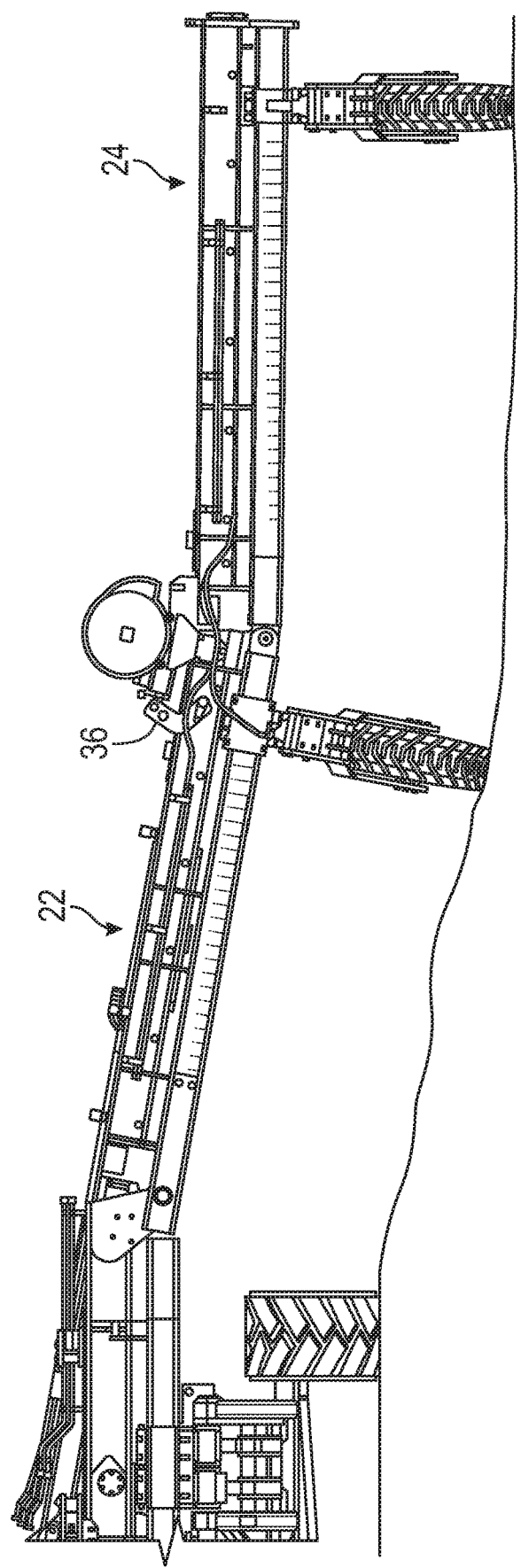
FIG. 15 is a rear view of the right wing in the unfolded use position and unlocked with the outer wing section flexed upwardly.
Figure 16:
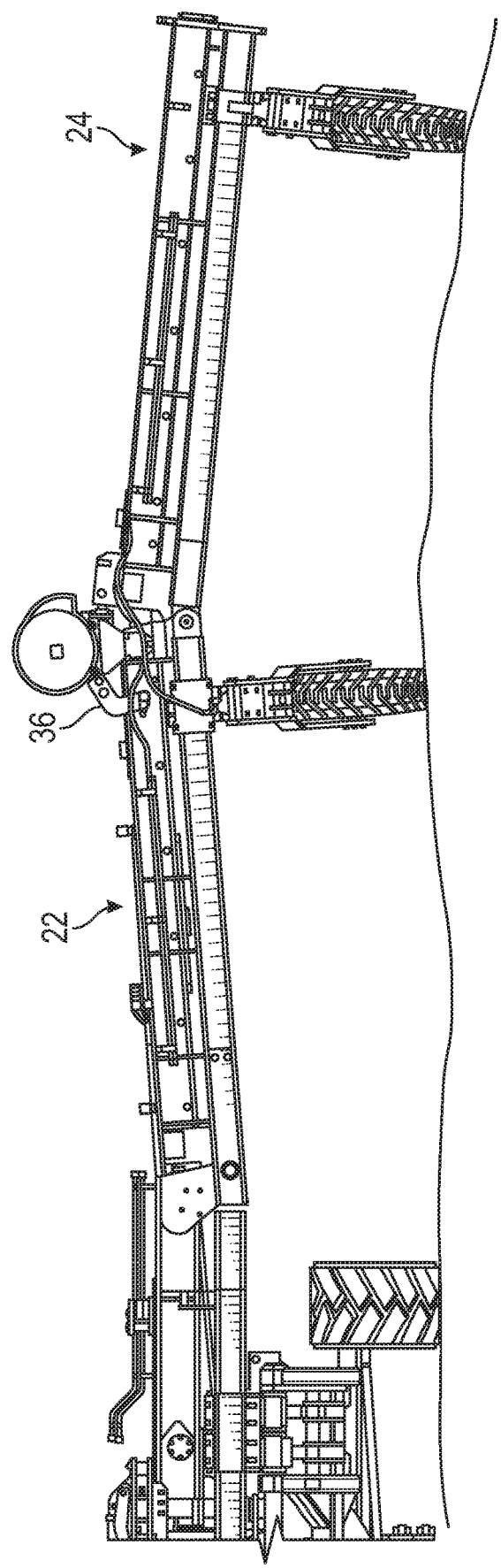
FIG. 16 is a view similar to FIG. 15, with the outer wing section flexed downwardly.

The operation of the pivot axes 26, 28 and the flex lock 36 are best shown in FIGS. 15 and 16. In these Figures, the wing sections 22, 24 are folded outwardly to the lateral, field position, such that the wheels 20, 30 engage and follow the contour of the ground. For example, in FIG. 15, the inner wing section is shown as being flexed downwardly relative to the rear center frame 14, with the outer wing section 24 being flexed slightly upwardly from the inner wing section 22. In FIG. 16, the inner wing section 22 is flexed upwardly relative to the rear frame 14, while the outer wing section 24 flexes downwardly from the inner wing section 22.

The adjustment assembly or mechanism 60 for the joint between the inner and outer wing sections prevents the wing sections from flexing downwardly when in the folded or transport position. When in the transport position, the wings are supported only at their opposite ends, but as the joints wear over time, the connection joint between the inner and outer wing sections 22, 24 can begin to sag, which is undesirable. The adjustment mechanism 60 locks the joint so as to prevent such downward flexing or sagging.

Figure 18:
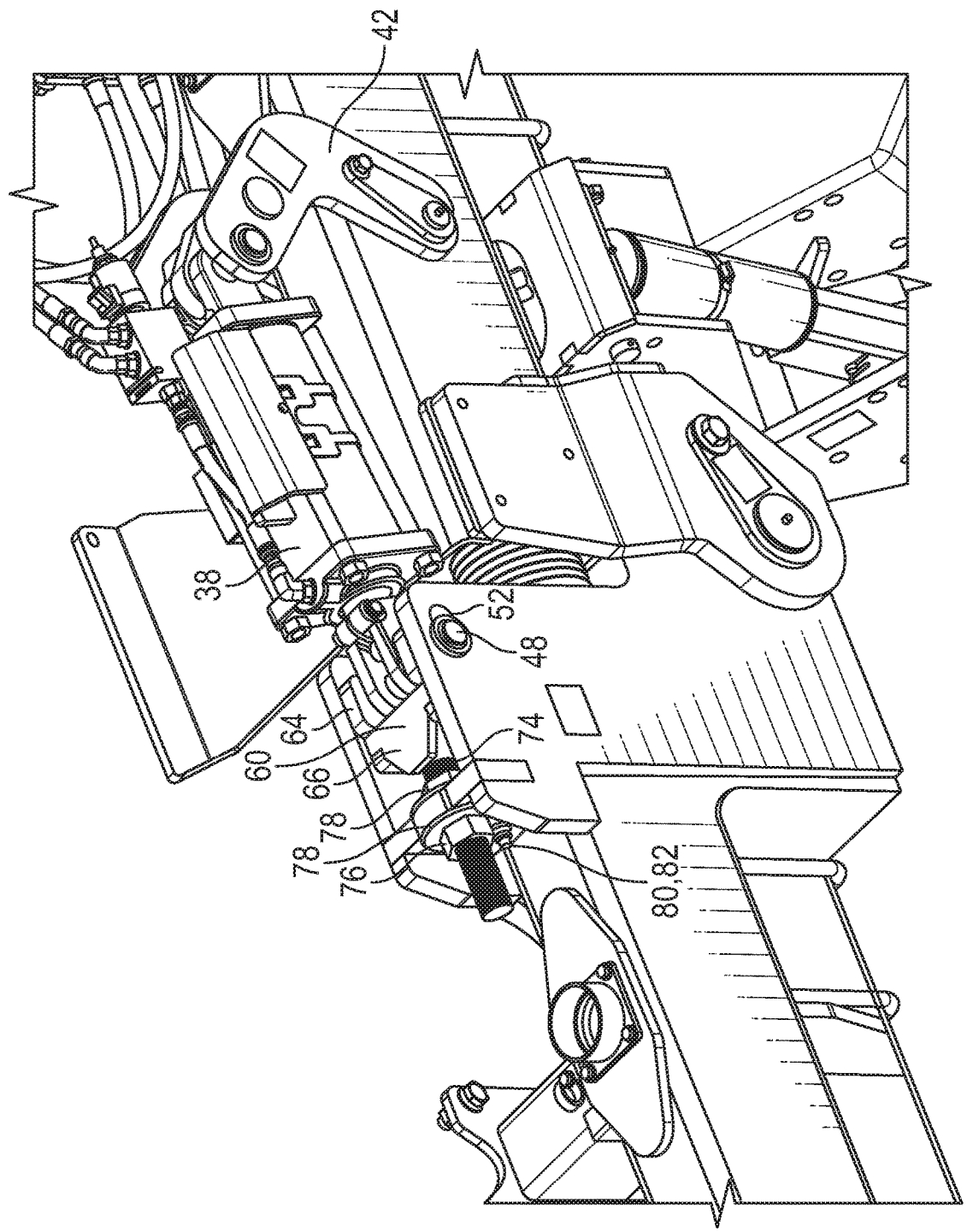
FIG. 18 is an enlarged perspective view showing the adjustment mechanism which aligns the inner and outer wings assemblies in the transport position.
Figure 19:
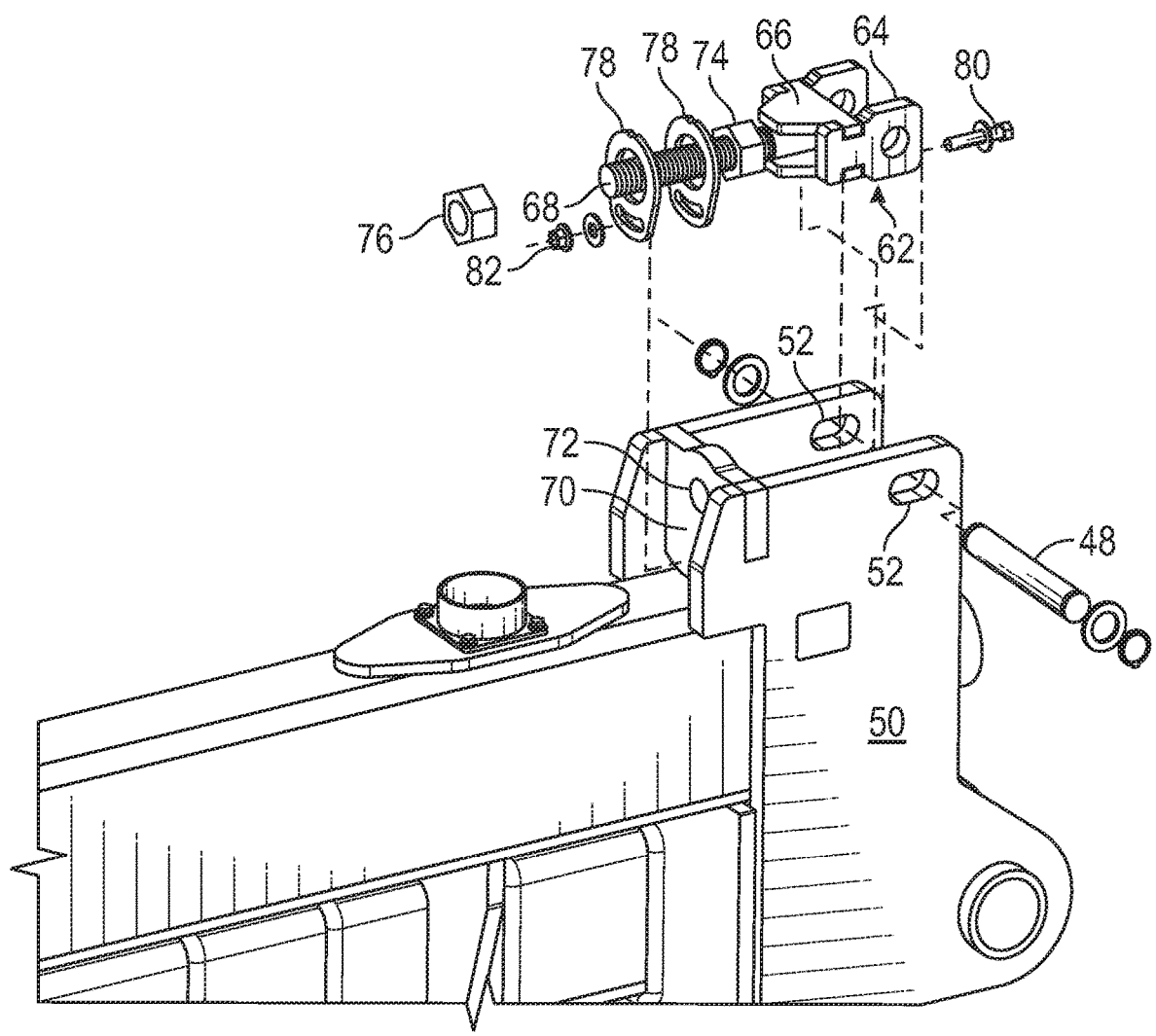
FIG. 19 is an exploded view of the adjustment mechanism.

As best seen in FIGS. 18 and 19, each adjustment mechanism 60 includes a weldment yolk assembly 62 having a vertically oriented clevis 64 on one end and a horizontally oriented clevis 66 on the other end. The outer end of the arm 40 of the cylinder 38 is connected to the vertical clevis 64 via the pin 48. A threaded shaft 68 is welded or fixed to the horizontal clevis 66 so as to extend in an opposite direction from the cylinder arm 40. A cross plate 70 extends between the side plates 50 and has a threaded hole 72 through which the shaft 68 extends. An inner nut 74 and outer nut 76 are threaded under the shaft 68 on opposite sides of the plate 70. Anti-rotation lock washers 78 are also provided on the shaft 68 between the nuts 74, 76 and the plate 70. A bolt 80 extends to slots in the lock washers 78 and receives a washer and nut 82 so that when the bolt 80 and nut 82 are tightened the lock washers 78 bear against the inner and outer nut 74, 76 to prevent rotation thereof.

If or when the wing joint becomes worn over time, the adjustment mechanism 60 allows the joint to be tightened. More particularly, the bolt 80 is removed from the lock washers 78, such that the nuts 74, 76 can be loosened, thereby allowing the shaft 68 to be moved through the hole 72 and the cross plate 70, thereby moving the yoke 62 closer to the cylinder from the cylinder 38 and pushing the end of the cylinder arm 40 inwardly in the slot 52. This adjustment of the cylinder arm 40 compensates for the worn wing joint and prevents downward flexing when the wing is in the transport position.

Figure 11:
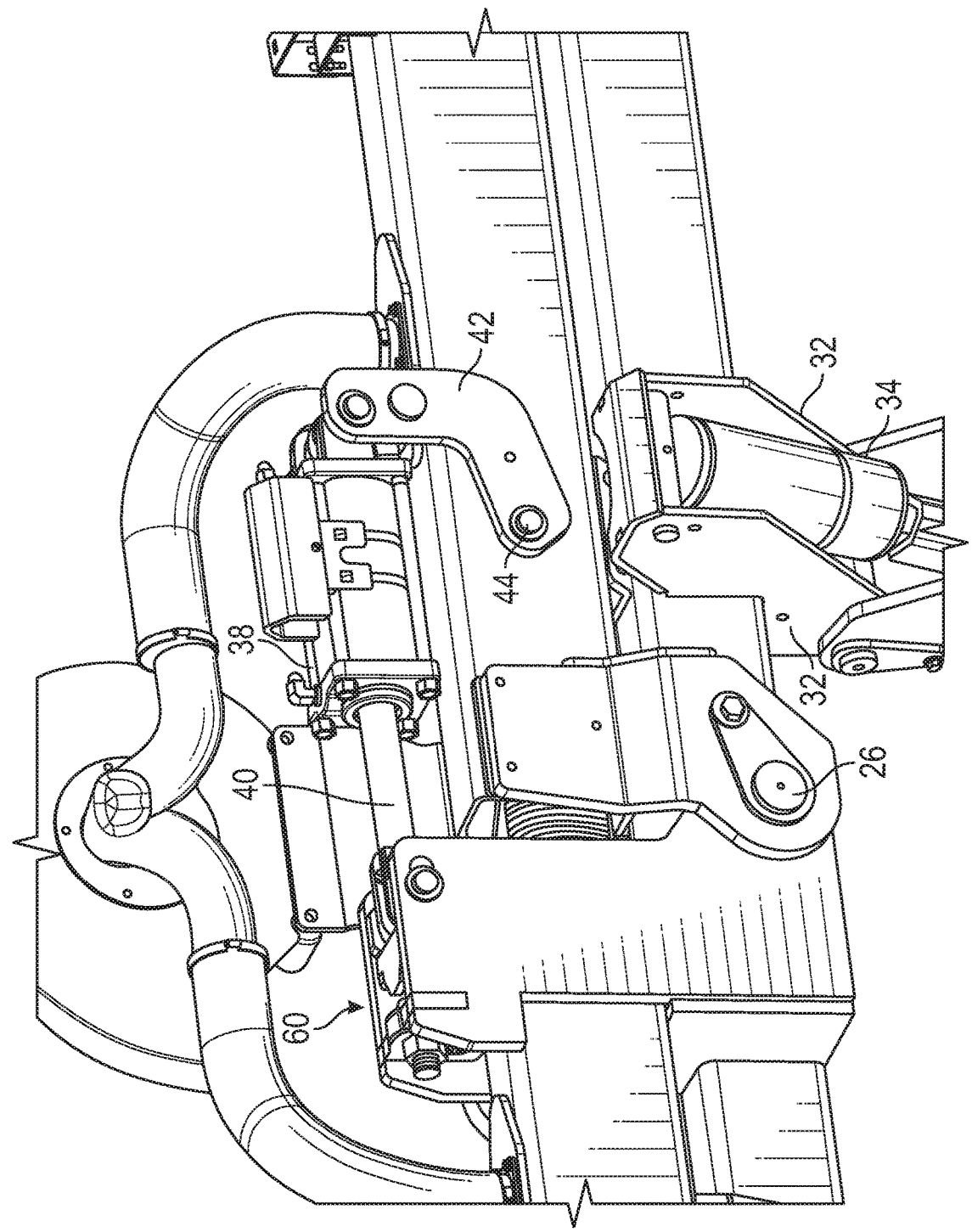
FIG. 11 is a close up view of the wing in a locked position.
Figure 12:
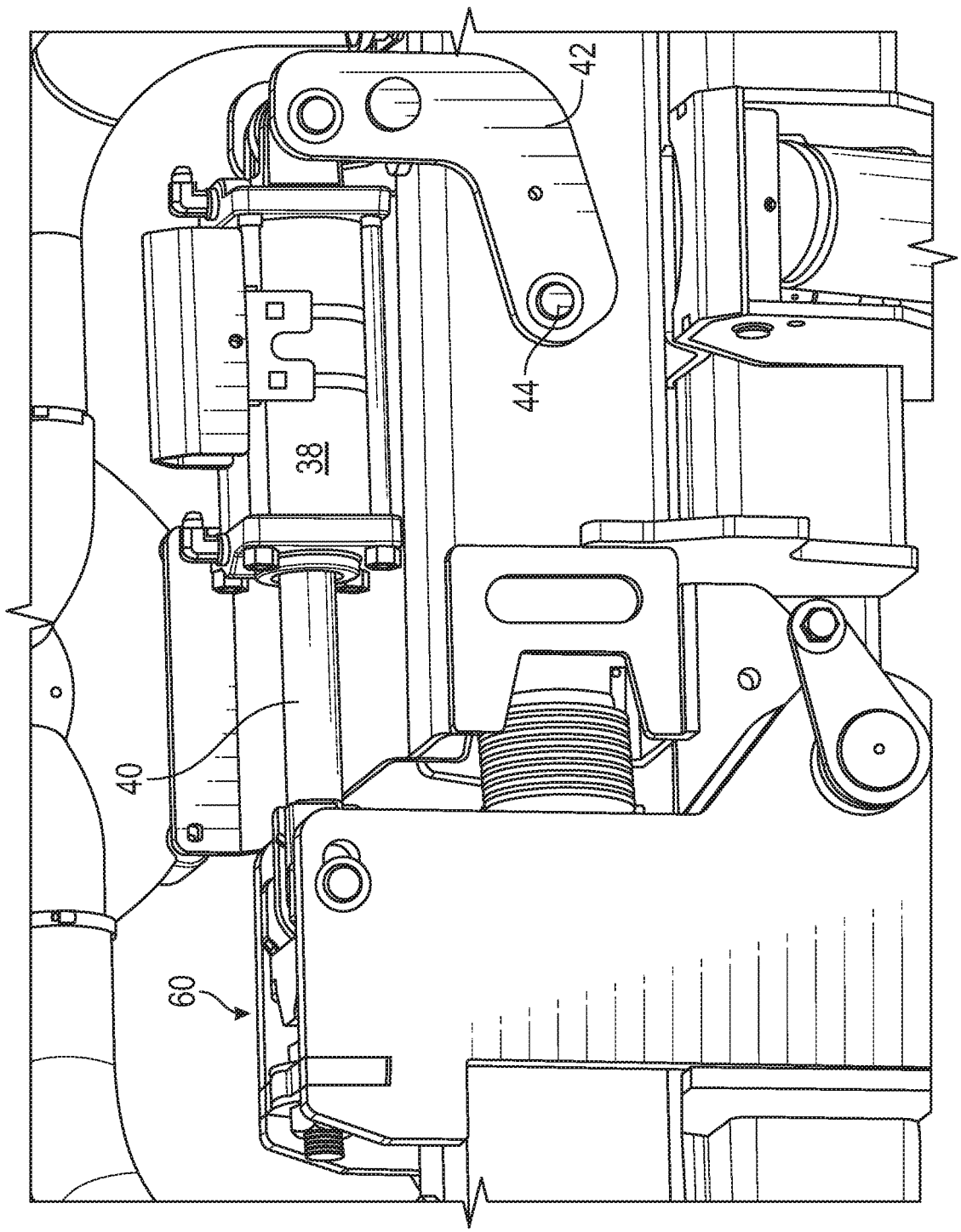
FIG. 12 is another enlarged view of the wing in a locked position.
Figure 13:
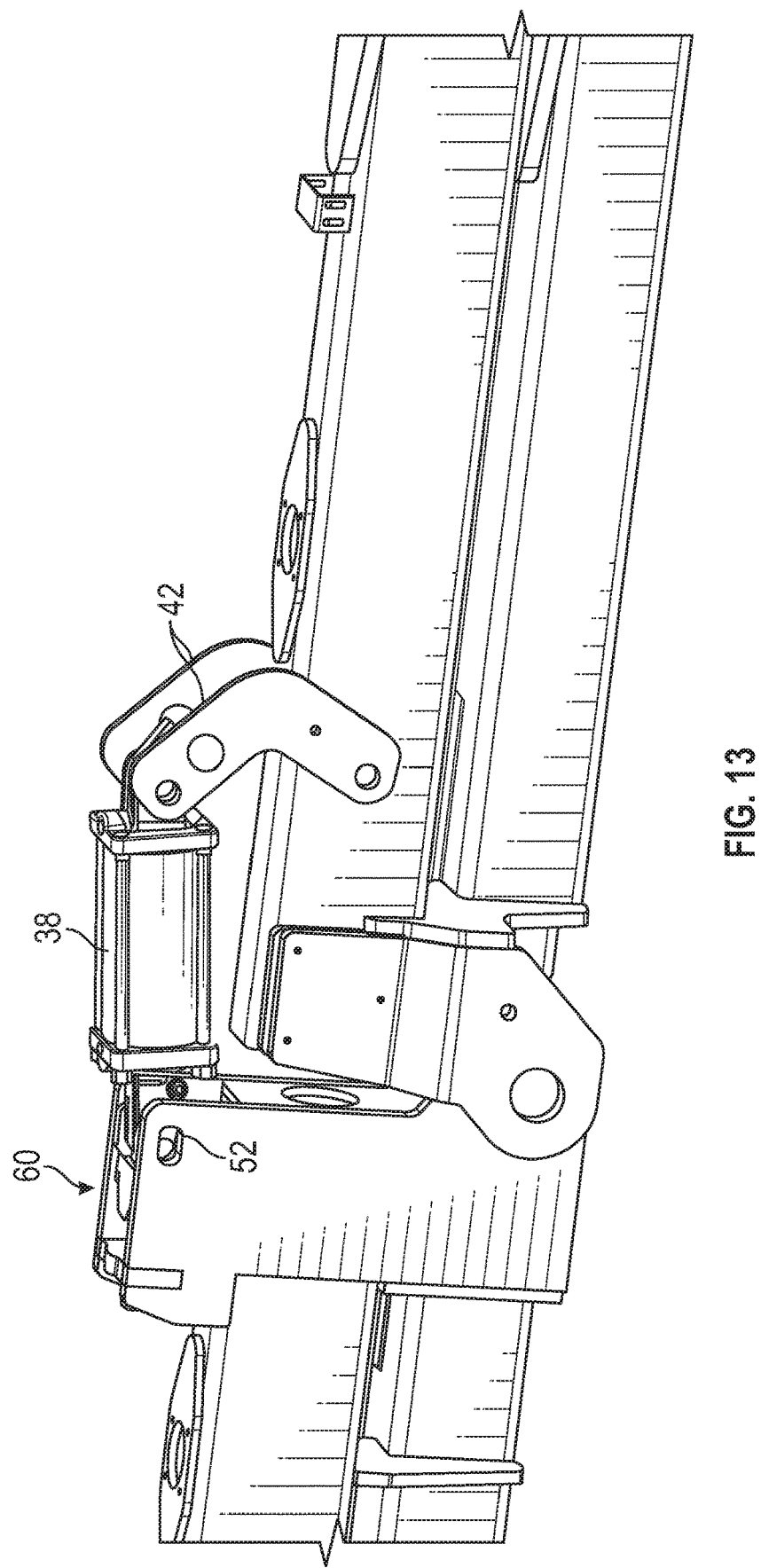
FIG. 13 is a perspective view of the wing in an unlocked position, with some external structures removed for clarity.
Figure 14:
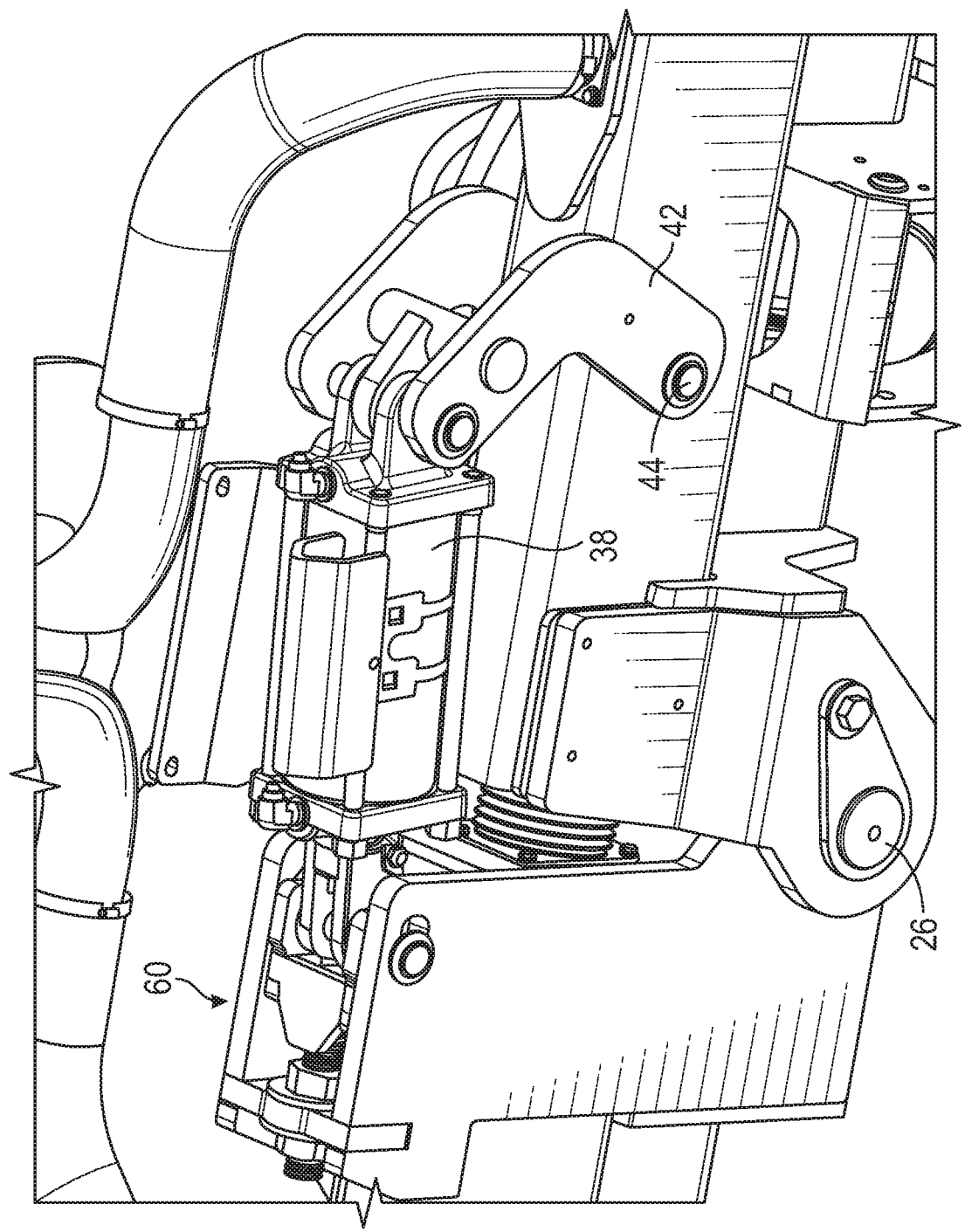
FIG. 14 is an upper perspective view of the wing in an unlocked position.

In use, the flex lock 36 which is operatively controlled from the tractor cab, is actuated so as to retract the arm 40, which allows the inner and outer wing sections 22, 24 to pivot about the axis of the pin 26. As the cylinder arm 40 is retracted, the mounting arms 42 are pulled upwardly and laterally outwardly, as seen in FIGS. 13 and 14. Thus, the wing sections 22, 24 are allowed to flex or float when the cylinder arm 40 is retracted. Before the wing 16 is folded to the transport position adjacent the tongue 12, the hydraulic cylinder 38 is actuated to extend the arm 40, as seen in FIGS. 11 and 12, which locks the inner and outer wing sections 22, 24 against any pivotal rotation about the axis 26. Thus, the wing sections 22, 24 cannot flex in the transport position.

Figure 17:
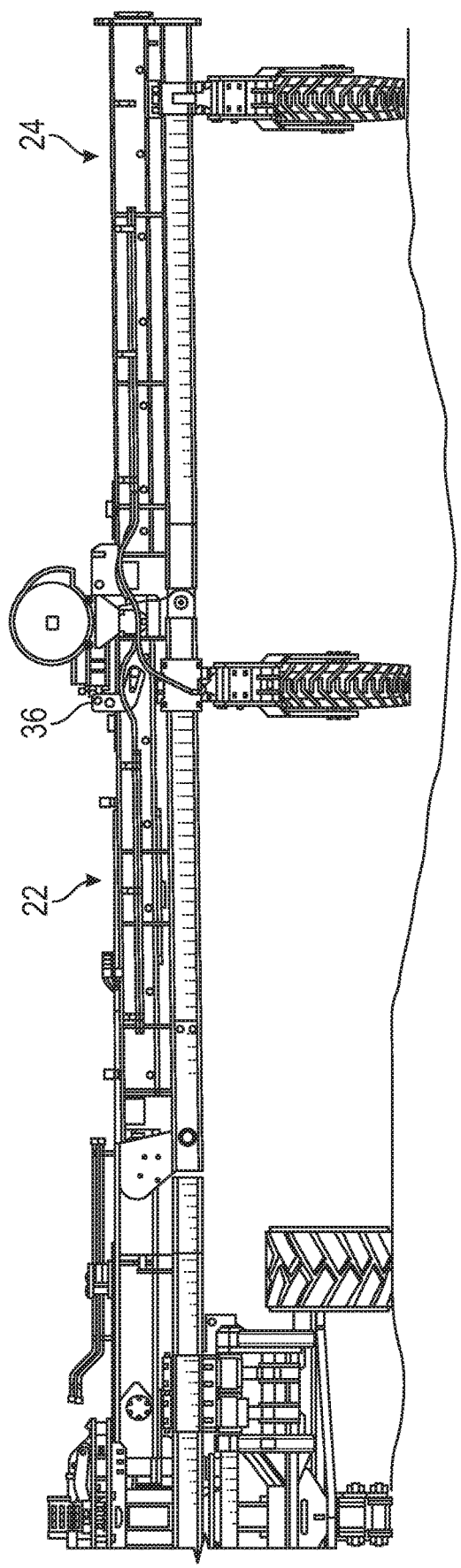
FIG. 17 is a view similar to FIG. 15 showing, hypothetically, the problem with a rigid or locked wing on uneven ground.

FIG. 17 shows a hypothetical situation which would arise if the wing sections 22, 24 were inadvertently locked against flexing and the ground contour was not even. In this situation, the wheel 30 of the non-flexing wing 16 would be raised off the ground, thereby providing no support for the wing and the instruments or tools attached to the wing.

Therefore, the flex lock 36 provides a quick and easy method and means for locking the wing sections 22, 24 against relative pivotal motion for the transport position of the wing 16, and for a quick and easy unlocking of the pivot joint between the wing sections 22, 24 in the field or use position such that the wings will float and flex to allow the wheels 20, 30 to follow the contour of the ground as the tractor pulls the tool bar through the field. Operation of the flex lock 36 is controlled by the operator via a computer in the cab of the tractor.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

The invention claimed is:

1. An agricultural tool bar, comprising:
   a center section;
   left and right inner wing assemblies on opposite sides of the center section and being horizontally foldable between field and transport positions;
   left and right outer wing assemblies pivotally connected to outer ends of the left and right inner wing assemblies, respectively for pivot movement about a horizontal axis;
   left and right hydraulic flex cylinders having opposite ends connected to the left and right inner and outer wing assemblies, respectively, to control pivotal movement of the left and right outer wing assemblies about the horizontal axes;
   one end of each hydraulic flex cylinder being mounted to a pivotal arm attached to respective ones of the inner wing assemblies; and
   the hydraulic flex cylinders each having an arm which extends to lock the outer wing assemblies against pivotal movement in the transport position and retracts to permit pivotal movement of the outer wing assemblies in the field position.

2. The agricultural tool bar of claim 1 wherein the hydraulic flex cylinders are inclined.

3. The agricultural tool bar of claim 1 further comprising a left adjuster and a right adjuster connected to the left and right flex cylinders, respectively, to align the left and right inner and outer wing assemblies during transportation.

4. The agricultural tool bar of claim 3 wherein each of the adjusters includes an extensible and retractable member to adjust the extension and retraction of the hydraulic flex cylinder.

5. The agricultural tool bar of claim 4 wherein the extensible and retractable member is a threaded shaft.

* * * * *